Patented Dec. 16, 1924.

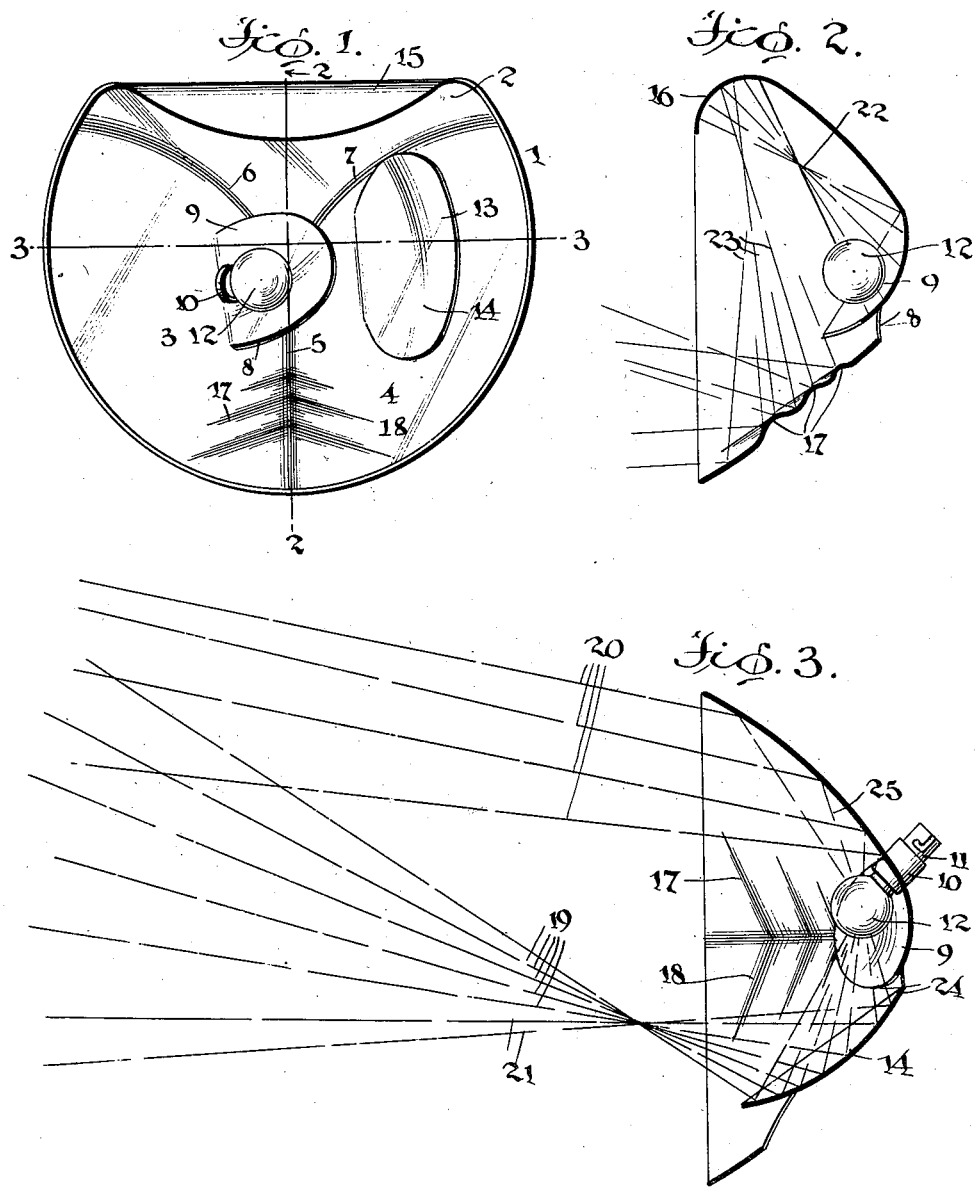

1,519,318

UNITED STATES PATENT OFFICE.

ORMOND C. MALCOLM AND BERNARD JASNESKI, OF AUBURN, NEW YORK.

HEADLIGHT FOR MOTOR VEHICLES.

Application filed October 12, 1923. Serial No. 668,137.

*To all whom it may concern:*

Be it known that we, ORMOND C. MALCOLM and BERNARD JASNESKI, citizens of the United States, residing at Auburn, in the county of Cayuga and State of New York, have invented certain new and useful Improvements in Headlights for Motor Vehicles, of which the following is a specification.

This invention relates to headlights for motor vehicles, more particularly to the reflecting element of the headlight, and the invention has for its object to provide, in a manner as hereinafter set forth, a headlight including means to accomplish two purposes, one of which is for projecting light rays forwardly in the usual manner, and the other of which is to project light rays upon the right hand side of the road in such a manner that a vehicle equipped with a device in accordance with this invention, can be safely driven with respect to any obstacles upon the road surface.

Further objects of the invention are to provide a headlight in a manner as hereinafter referred to and for the purposes set forth, which is simple in its construction and arrangement, strong, durable, thoroughly efficient in its use, readily assembled and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a reflector element, in accordance with this invention.

Figure 2 is a section on line 2—2, Figure 1.

Figure 3 is a section on line 3—3, Figure 1.

Referring to the drawings in detail, a reflector element in accordance with this invention, comprises a body portion, referred to generally by the reference character 1, which is parabolical in contour in vertical or transverse section. The body portion 1 is constructed of any suitable material and has its forward face highly polished to constitute a reflecting medium.

The said body portion 1 comprises an upper part 2 and a pair of side parts 3 and 4. The side parts 3 and 4, at the inner termini merge into each other upon a straight line 5, centrally of the lower part of the body portion 1, and the upper termini of the parts 3 and 4 merge into the lower terminus of the upper part 2 upon diverging lines, as indicated at 6 with respect to the upper terminus of the part 3, and at 7 with respect to the upper terminus of the part 4. The parts 3 and 4 correspond in contour and are of a different contour with respect to the part 2.

At the point of mergence of the parts 2, 3, 4, the body portion 1 is formed with an angularly disposed semi-oval shaped slit 8 and which has the termini thereof arranged at the part 3, at one side of and above and below the center of the body portion 1. The material freed by the slit 8 is offset with respect to the parts 2, 3 and 4, and which provides a centrally disposed reflecting member 9, arcuate in cross or longitudinal section at any point throughout its width or length.

The part 3, at the connected terminus of the member 9 carries an angularly disposed socket 10 for the reception of the plug 11 of an illuminating element 12, which is disposed at an inclination with respect to the member 9, and has the major portion thereof positioned to one side of the axis of the body portion 1.

The part 4 is slitted, as at 13, in the direction of its length and with the upper part of the walls of the slit extended to the upper terminus of the part 4, and with the lower part of the walls of the slit positioned above the bottom of the part 4. The slit 13 is disposed substantially centrally of the part 4, and the material freed by the slit 13 is projected forwardly and provides an oval-shape reflecting member 14 inclining towards the member 9, of greater length than the length of the member 9 and extending at an angle with respect to the direction in which the member 9 extends. The member 14 is arcuate in transverse or longitudinal section.

The upper portion of the part 2 is bent downwardly in a curvilinear manner so as to overhang, as indicated at 15, and the inner face of said overhang forms a reflecting member, as indicated at 16.

Centrally of the lower part of the body portion 1, the parts 3 and 4 are corrugated and with the corrugations of the part 3 extending in opposite directions with respect to the corrugations of the part 4. The corrugations on the part 3 are indicated at 17, and the corrugations on the part 4 are indicated at 18. The corrugations 17 merge into the corrugations 18 at the joinder of the part 3 with the part 4, centrally of the body portion 1, and the said corrugations 17 and 18 provide reflecting surfaces.

The member 14 is employed for reflecting the light rays to the right hand side of the road, as indicated at 19, in Figure 3, and the part 3, as well as the lower portion of the part 2 and inner portion of the part 4, other than the corrugations 17 and 18, projects the rays forwardly, as indicated at 20 and 21, Figure 3. The outer portion of the member 9 reflects the light rays against the reflecting member or medium 16, as indicated at 22 in Figure 2. The reflecting member or medium 16 reflects the light rays against the corrugations 17 and 18, as indicated at 23, Figure 2. The rays from the illuminating element 12 are directed towards the member 14, as indicated at 24, and also from the element 12 towards the outer portion of the part 3, as indicated at 25.

The body portion 1 is adapted to be inclosed in a suitable casing, not shown, and which is provided with any form of lens, not shown. It is thought unnecessary to illustrate the inclosing casing or housing for the reflecting element as the latter can be employed in connection with any suitable form of casing or housing.

It is obvious that the reflecting members can be arranged opposite to what is illustrated, so that the reflecting element can be employed for directing the light rays to the left hand side in lieu of to the right hand side of the road.

A reflecting element in accordance with this invention not only provides means for spreading the forward light rays, but also includes means whereby light rays are projected to the right hand side of the road to insure safe driving, and although the preferred embodiment of the invention is as illustrated and described, yet it is to be understood that changes in the details of construction can be had which will fall within the light of the invention as claimed.

What we claim is:—

1. A reflecting element for headlights comprising a body portion of parabola contour in horizontal and vertical section and having its forward face constituting a reflecting medium for forwardly directed rays, said body portion provided at its top with an overhang and at its bottom centrally with corrugations for reflecting light rays directed thereon by said overhang, said body portion having as an inherent part thereof an offset concave deflecting member extending across the vertical axis thereof and positioned rearwardly of and opposing an eccentrically disposed illuminating element and further coacting with said overhang, and said body portion further having as an inherent part thereof an offset concave reflecting member at one side of the vertical axis thereof and arranged in proximity to and extending in an opposite direction with respect to the first mentioned reflecting member and providing means for reflecting light rays upon the right hand side of the road.

2. A reflecting element for headlights comprising a body portion of parabola contour in horizontal and vertical section and having its forward face constituting a reflecting medium for forwardly directed rays, said body portion provided at its top with an overhang and at its bottom centrally with corrugations for reflecting light rays directed thereon by said overhang rays, said body portion having as an inherent part thereof a forwardly projected offset deflecting member extending across the vertical axis thereof and positioned rearwardly of and opposing an eccentrically disposed illuminating element and further coacting with said overhang, and said body portion further having as an inherent part thereof a forwardly projected offset reflecting member at one side of the vertical axis thereof and arranged in proximity to and extending in an opposite direction with respect to the first mentioned reflecting member and providing means for reflecting light rays upon the right hand side of the road, said members and overhang being arcuate in cross section.

3. A reflecting element comprising a body portion having its forward face providing a reflecting medium and further having inherent portions thereof forming an overhang and a pair of forwardly projected offset reflecting members, one of said members extending across the vertical axis of said body portion and the other of said members positioned at one side of the vertical axis of the body portion and inclining towards the first mentioned member, said first mentioned member cooperating with said overhang and adapted to be positioned rearwardly of and opposing an eccentrically disposed illuminating element, and said body portion, centrally of its lower part formed with oppositely extending deflecting corrugations associating with the overhang.

4. A reflecting element comprising a body portion having its forward face providing a reflecting medium and further having inherent portions thereof forming an overhang and a pair of forwardly projected offset reflecting members, one of said members extending across the vertical axis of said body portion and the other of said members positioned at one side of the vertical axis of the body portion and inclining towards the first mentioned member, said first mentioned member cooperating with said overhang and adapted to be positioned rearwardly of and opposing an eccentrically disposed illuminating element, and said body portion, centrally of its lower part formed with oppositely extending deflecting corrugations associating with the overhang, said members extending in opposite directions with respect to each other and being arcuate in cross section.

5. A reflecting element comprising a body portion having its forward face forming a reflecting medium, said body portion provided with a pair of slits, the material freed by said slits being projected forwardly to provide a semi-oval shaped offset reflecting member and an oval-shaped offset reflecting member, said semi-oval shaped member extending across the vertical axis of said body portion towards the other of said members, said oval-shaped member of greater length than and extending above the other of said members, said body portion further provided at its top with an overhang cooperating with said semi-oval shaped member positioned to one side of the vertical axis of the body portion, and said body portion at its bottom formed with a corrugated part associating with the overhang, and means for securing an illuminating element eccentrically with the body portion and forwardly of said semi-oval shaped member.

6. A reflecting element comprising a body portion having its forward face providing a reflecting medium and further provided at its top with a forwardly projected transverse overhanging portion, an offset portion extending across the vertical axis thereof and a corrugated portion arranged at the lower part and extending across the vertical axis thereof, said portions providing means for deflecting the light directed forwardly by said body portion, and said body portion further provided with a forwardly projecting vertical offset portion at one side of its vertical axis for directing light rays to the right hand side of a road.

7. A reflecting element comprising a body portion having its forward face providing a reflecting medium and further provided at its top with a forwardly projected transverse overhanging portion, an offset portion extending across the vertical axis thereof and a corrugated portion arranged at the lower part and extending across the vertical axis thereof, said portions providing means for deflecting the light directed forwardly by said body portion, and said body portion further provided with a forwardly projecting vertical offset portion at one side of its vertical axis for directing light rays to the right hand side of the road, each of said offset portions being arcuate in lengthwise and transverse section, and the corrugations of said corrugated portions being semi-circular in cross section.

8. A reflecting element comprising a body portion having the lower part centrally thereof corrugated, a semi-oval shaped reflecting member forming a part of said body portion, offset with respect thereto and extending at an upward inclination and across the axis of the body portion, an oval-shaped deflecting member forming a part of the body portion offset with respect thereto and spaced from the free terminus of the other member and extending in an opposite direction with respect thereto, and said body portion having its top formed with an overhanging part coacting with said corrugations and semi-oval shaped member.

9. A reflecting element comprising a body portion of parabolical contour having a substantially semi-oval slit centrally thereof, the material freed by the slit projectd forwardly at an outward inclination and forming a horizontally disposed offset reflecting member extending across the vertical axis of said body portion and provided with means to support a light source forwardly and eccentrically thereof, said body portion further having an overhanging reflecting part at its top, said offset member receiving rays from the light source and directing them to said overhanging part and the latter directing the rays to the lower part of the body portion for projecting them outwardly.

In testimony whereof, we affix our signatures hereto.

ORMOND C. MALCOLM.
BERNARD JASNESKI.